US006690399B1

(12) United States Patent
Carlson et al.

(10) Patent No.: US 6,690,399 B1
(45) Date of Patent: Feb. 10, 2004

(54) DATA DISPLAY SOFTWARE FOR DISPLAYING ASSAY RESULTS

(75) Inventors: Neil Carlson, Cambridge, MA (US); Michelle A. J. Palmer, Arlington, MA (US)

(73) Assignee: Tropix, Inc., Bedford, MA (US)

( * ) Notice: Subject to any disclaimer, the term of this patent is extended or adjusted under 35 U.S.C. 154(b) by 0 days.

(21) Appl. No.: 09/565,385

(22) Filed: May 5, 2000

Related U.S. Application Data
(60) Provisional application No. 60/133,113, filed on May 7, 1999.

(51) Int. Cl.[7] ............................. G06F 3/14; G06F 19/00; G01N 33/00
(52) U.S. Cl. ....................... 345/771; 345/440; 345/968; 345/837; 435/288.3; 435/4; 435/288.4; 702/19; 702/30; 715/503
(58) Field of Search ............................. 345/771, 440, 345/968, 835, 764, 765, 866, 440.2, 837, 839, 833, 856, 853; 702/19, 22, 27, 23, 25, 30, 32, 190–191, 193; 435/4, 7.1, 7.4, 7.9, 287.1, 287.3, 288.3, 288.4, 288.7; 715/503–504; 707/104.1, 3, 2

(56) References Cited

U.S. PATENT DOCUMENTS

| | | | | |
|---|---|---|---|---|
| 5,479,598 A | * | 12/1995 | Feitelson et al. | ........ 345/835 X |
| 5,976,813 A | * | 11/1999 | Beutel et al. | ................ 435/7.1 |
| 5,989,835 A | | 11/1999 | Dunlay et al. | ............... 435/7.2 |
| 6,023,694 A | | 2/2000 | Kouchi et al. | .................. 707/2 |
| 6,331,441 B1 | * | 12/2001 | Balch et al. | ......... 435/287.1 X |
| 6,420,178 B1 | * | 7/2002 | LaGraff et al. | .......... 435/7.1 X |
| 6,475,809 B1 | * | 11/2002 | Wagner et al. | ............. 435/4 X |

* cited by examiner

*Primary Examiner*—Raymond J. Bayerl
(74) *Attorney, Agent, or Firm*—Piper Rudnick LLP; Steven B. Kelber

(57) ABSTRACT

A method and apparatus for displaying data presents results from a single assay across multiple wells and plates on a single screen in a format that preserves the spatial relationship between the wells on a plate and the sequential relationship between plates. Also provided to the user is the ability to display these results from multiple wells in a color coded format corresponding to a binary (e.g. good/bad) or quadripartite (e.g. good/marginally good/marginally bad/bad) division. Also displayed are plate-wide statistics, such as signal-to-noise ratio and variability, for multiple plates on a single screen so that problem plates can be readily identified. The ability for a user to view a summary of performance on a well-by-well basis across all compounds/plates is also provided to aid the user in detecting general trends, including the possible existence of mechanical errors. Finally, the user is also provided with the ability to select or deselect plates and assays for review in the above formats.

28 Claims, 12 Drawing Sheets

(11 of 12 Drawing Sheet(s) Filed in Color)

DATA DISPLAY SOFTWARE FOR DISPLAYING ASSAY RESULTS

This application is a regular National application claiming priority from Provisional Application, U.S. application Ser. No. 60/133,113 filed May 7, 1999. The entirety of that provisional application is incorporated herein by reference.

The following files created on May 14, 2003, which are included in a computer program listing appendix submitted on a compact disc pursuant to 37 C.F.R. §1.52, are hereby incorporated by reference herein. The machine format is IBM-PC and the operating system is MS-Windows.

| Name of File: | Size in bytes |
| --- | --- |
| frmAPlateGraphic.txt | 33,234 |
| frmAPlatePattern.txt | 7,827 |
| frmA.PlatePerform.txt | 14,656 |
| frmAplatesToSelect.txt | 322 |
| frmAPlateText.txt | 9,487 |
| frmCompoundList.txt | 11,045 |
| frmFreeText.txt | 343 |
| frmLimits.txt | 28,603 |
| frmPreSelect.txt | 18,306 |
| frmSelectedPlates.txt | 27,587 |
| frmSignIn.txt | 3,939 |
| frmSPlash.txt | 290 |
| frmSPlateGraphic.txt | 28,865 |
| frmSplateText.txt | 9,405 |
| frmSummary.txt | 7,701 |
| frmSummaryGraphic.txt | 25,106 |
| frmSummaryParent.txt | 147 |
| frmThreshold.txt | 95 |
| Declarations.txt | 11,336 |
| Functions.txt | 50,608 |

BACKGROUND OF THE INVENTION

There are numerous situations in which data is generated and collected in a two dimensional format. An example of data generated in a two dimensional format occurs in biology, where assays of many different types are performed using microplates and chip-based arrays (microplates and chip-based arrays are referred to as plates herein). One such example is high throughput screening. Increasingly, high throughput screening of multi-well plates, also known as microplates, or similarly prepared sequences of small chambers that constitute reaction chambers is the method of choice for a wide variety of biological assays. In this high throughput screening (HTS) method, hundreds and thousands of combinations of potential actives, samples, probes and agents are combined, and subjected to the same reaction conditions. The plates used in such screening methods may have in excess of 400 wells per plate. Frequently, each well is inspected to determine the presence and strength of a particular signal, such as a chemiluminescent, colorometric, agglutination or other visibly detectable signal. The types of assays employing HTS technology are not particularly limited, but include reporter gene assays, immunoassays, fingerprint assays, etc.

In many embodiments, HTS technology involves preparing the mixture of sample and reagent in each of the wells of a series of microplates, under the same conditions, by robotic means, in a controlled and sealed environment. In this way, each of the wells faces the same conditions, except for the variable selected. The well plates or other reagent holders move forward in "assembly line" fashion, until the reaction is complete, and it is time to detect the absence, presence and/or strength of the signal. In a qualitative assay, either the presence or absence of the visually detectable signal can be positive. In a quantative assay, measuring the strength of the signal becomes paramount. In order to inspect, for example, the influence of a wide variety of genetic modifications to a specific gene on the expression of that gene, it may be necessary to have many thousands of plates read under the same conditions.

Thus, HTS technology places certain demands on the ability to rapidly inspect, understand and correlate visually detectable data. Ideally, real time measures, or measures as close to real time as possible, are sought so that anomalies and events detected can be investigated. Given the large quantities of information and types of signals to be detected, and the importance of comparing and contrasting each event inspected, computer technology is preferably employed. Nonetheless, employing computer technology, the human operator is confronted with the difficulty of treating the vast amounts of information provided on a reasonable scale.

What is needed is a method and system for displaying data in an easily understood form that allows a user to rapidly review and assess the data.

SUMMARY OF THE INVENTION

The present invention meets the aforementioned need to a great extent by providing a method and apparatus for displaying data in a form that allows a user to rapidly review the data and identify assays of interest for further inspection or other action and visualize overall trends in the data. The invention accomplishes this through the presentation of results from a single assay across multiple wells and plates on a single screen in a format that preserves the spatial relationship between the wells on a plate and the sequential relationship between plates. This is done because it has been found that it is easier for a user to make the same decision about multiple items of the same type than it is to make multiple decisions of different types for the same item. The invention also provides the user with the ability to display these results from multiple wells in a color coded format corresponding to a binary (e.g. good/bad) or quadripartite (e.g. good/marginally good/marginally bad/bad) division. The invention also displays plate-wide statistics, such as signal-to-noise ratio and variability, for multiple plates on a single screen so that problem plates can be readily identified. The ability for a user to view a summary of performance on a well-by-well basis across all compounds/plates is also provided to aid the user in detecting general trends, including the possible existence of mechanical errors. Finally, the invention provides the user with the ability to select or deselect plates and assays for review in the above formats.

BRIEF DESCRIPTION OF THE DRAWINGS

The file of this patent contains at least one drawing executed in color. Copies of this patent with color drawings will be provided by the Patent and Trademark Office upon request and payment of the necessary fee.

The foregoing and other advantages and features of the present invention will be more readily understood with reference to the following figures, in which:

FIG. 1 is a drawing of a prior art display screen from a high throughput screening data analysis program.

FIG. 6 is a drawing of a display screen subsequent to the display screen of FIG. 5.

DETAILED DESCRIPTION

Figure 2:
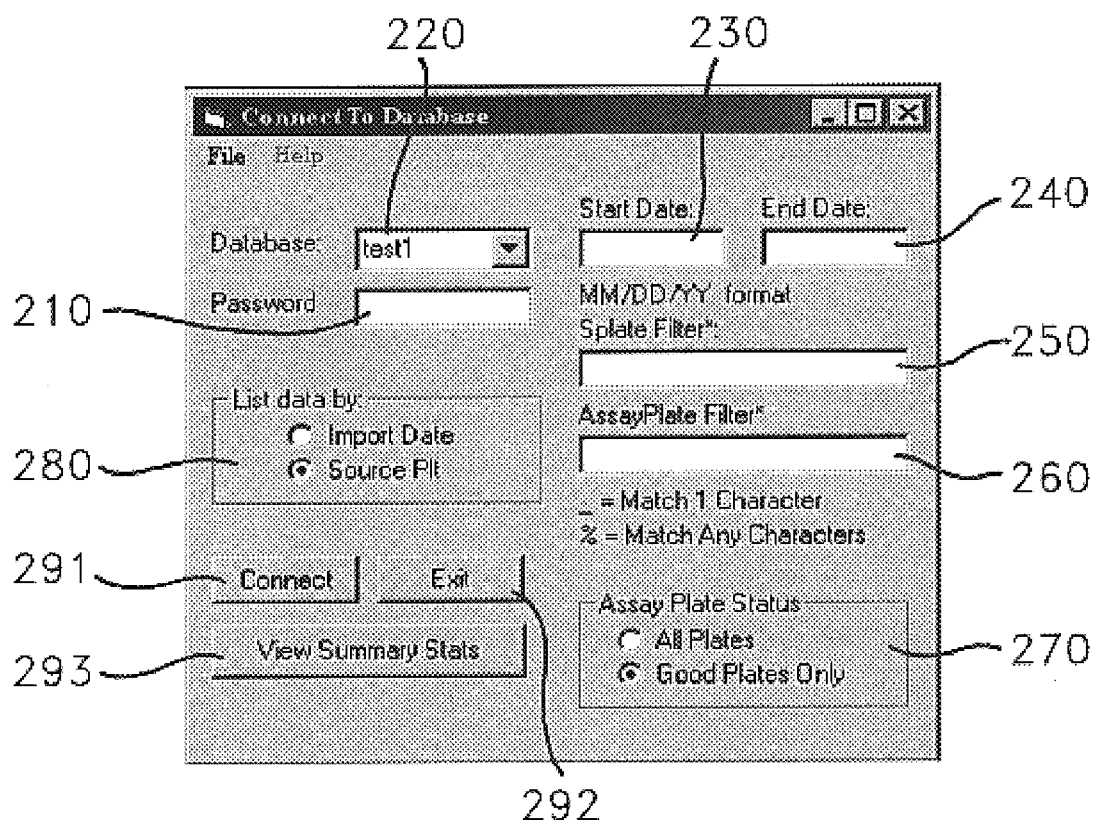
FIG. 2 is a drawing of an initial display screen from a high throughput screening data analysis program according to one embodiment of the present invention.

The present invention will be discussed with reference to a preferred embodiment of a data analysis program. The invention is believed to be particularly well suited to high throughput screening applications, and thus will be illustrated by a preferred embodiment directed toward high throughput screening. The invention should not be understood, however, to be limited to high throughput screening applications. The invention may be used in any situation in which data is generated and collected in a two dimensional format, and is not limited to plates. Numerous specific details, such as specific colors, display dimensions, assay types, etc., are set forth in order to provide a thorough understanding of the present invention. The preferred embodiment described herein should not be understood to limit the invention.

Before proceeding with the detailed description, an explanation of some of the terms used herein is provided. Throughout the specification, references will be made to "source plates" and "assay plates." As used herein, a source plate refers to a plate on which material is stored, while an assay plate refers to a plate on which assays are run. It is a common practice, and often necessary, for material used in assays to be frozen. Furthermore, assays involving the same material often must be run many times on different days. In order to avoid freezing and thawing such material multiple times (which may damage the material), temporary storage plates, referred to herein as master and daughter plates, are often prepared with material from the source plates. The source (and master and daughter where applicable) plate IDs are maintained in the database along with the assay plate IDs. A single source or assay plate may contain a single compound or multiple compounds.

Reference is made herein to "% Stimulation" and "% Inhibition." These values are typically measured relative to "control" wells on assay plates. It is customary for the first and last columns of wells (or some portion thereof) to include a low control and a high control. The low control is a material which will completely inhibit a reaction, while the high control is a material which is highly reactive. The low control well is taken to represent 100% inhibition and the high control well is taken to represent 0% inhibition. The "% Inhibition" is thus a measure of the amount of reaction in a well relative to the controls. If a material is more reactive than the material in the high control well, this result is referred to as stimulation (rather than negative inhibition). While inhibition must range between 0% and 100%, stimulation is unbounded in theory. The signal to noise, or S/N, is simply a ratio of the results from the high and low control wells. If the S/N for an assay plate is not sufficiently high, then the results from that plate may be unreliable.

Figure 1:
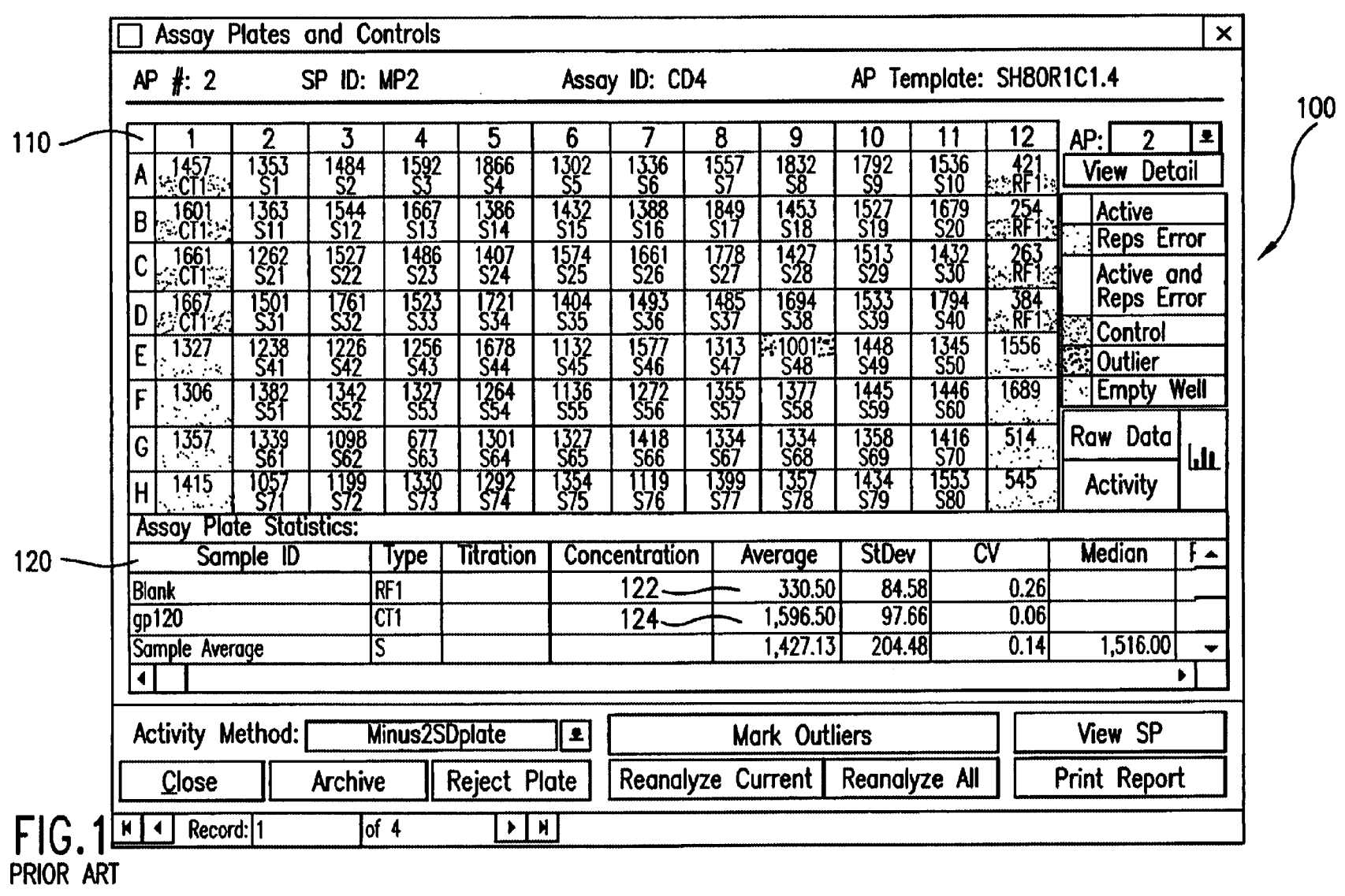

FIG. 1 illustrates a display screen 100 from a prior-art data analysis program. The display 100 shows the results from a 96-well microplate; accordingly, the results for the assay identified as CD4 for each well are presented in a well table 110 with 12 columns and 8 rows of cells (labeled A–H in FIG. 1). Each cell in columns 2–11 includes 2 values: the actual test data is presented on top and the sample number is presented below. The cells in the far left and right columns 1 and 12 represent the plate control wells and therefore only include the test values for the controls. Statistics for the entire plate are presented in a plate table 120 located beneath the well table 110. The table 120 includes the CV (a measure of variablility), averages and standard deviations for both the controls and samples, as well as the median for the samples.

When presented with the screen 100, a user must make several decisions. First, the operator must determine whether the plate is good. This includes determining whether the plate signal to noise values are sufficient and whether the variability is acceptable. The signal to noise can be determined with reference to averages for the positive and negative controls shown in cells 122 and 124 of table 120. In this case, the signal-to-noise value is 1596.50 to 330.50. Once the user has determined that the plate is good, the user must then examine the numerical values for each well to identify wells of interest. In the table 110, most wells exhibit values well over 1000. Thus, a possible threshold of interest is 1000. In order to identify the wells of interest, a user is required to examine each upper value of the table 110 in order to identify which cells, such as cell G3, are below the threshold.

It will be readily appreciated by those of skill in the art that reviewing results in the format described above from large numbers of wells and plates in a high throughput screening scenario quickly becomes burdensome. The resulting fatigue may result in mistakes in identifying wells of interest. Furthermore, determining values for thresholds of interest often cannot be done without reviewing several plates to get a sense of the "global" results. Thus, the plates reviewed initially may require a second review after the threshold in determined, resulting in even further inefficiency.

The above-described display screen is plate-oriented; that is, the results are presented relative to the microplates on which the assays were performed. Other prior art display programs are compound-oriented. Such programs will display, for a single compound, the results of several assays regardless of whether the assays were performed on the same or different plates. Such programs suffer from problems analogous to those faced by the plate-oriented displays. Thus, neither plate-oriented or compound-oriented displays are well suited for high throughput screening.

The operation of the present invention will now be discussed with reference to FIG. 2. FIG. 2 illustrates the initial screen 200 presented to a user upon program start-up, which is to entitled "Connect to Database." The screen 200 includes a password dialog box 210 for security. Also included are a number of boxes that allow the assay data to be filtered (as used herein, filtering refers to selecting or de-selecting certain data for review and/or analysis): a database box 220 for selecting the file/database containing the desired data; start and end date boxes 230, 240 for filtering the assay data by date; a source plate filter box 250 for filtering by source plate; and an assay plate box 260 for filtering by assay plate. Selection box 270 allows all plates or good plates only to be selected (how good plates are distinguished from bad plates is discussed in further detail below). Finally, pressing button 291 connects the program to the database, button 292 disconnects the system from the database and button 293 causes the display summary statistics (discussed in further detail below in connection with screen 1200).

Figure 3:
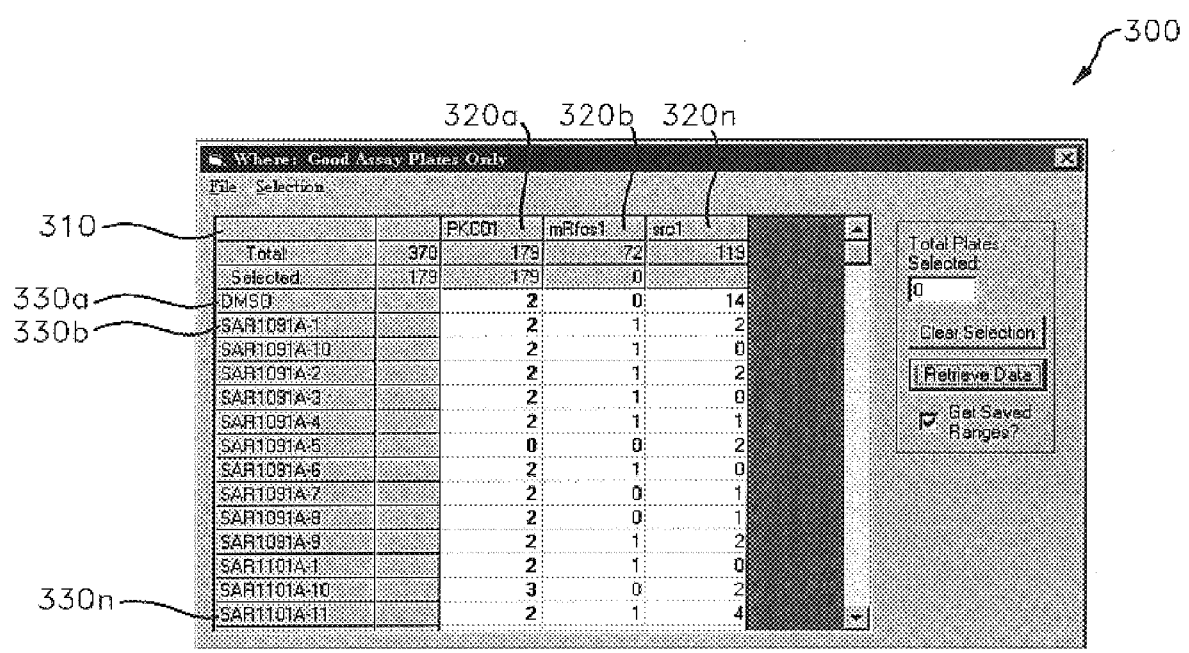
FIG. 3 is a drawing of a display screen subsequent to the display screen of FIG. 2.

Once the plates matching the aforementioned filters have been entered at the screen 200, the plates selected by those filters are listed in table 310 of the third screen 300 shown in FIG. 3. The table 310 lists the available assays 320*a–n* as well as the available plate designations 330*a–n* (or, alternatively, the available dates). Plates may be further filtered by being selected (or de-selected) at this screen 300.

Figure 4:
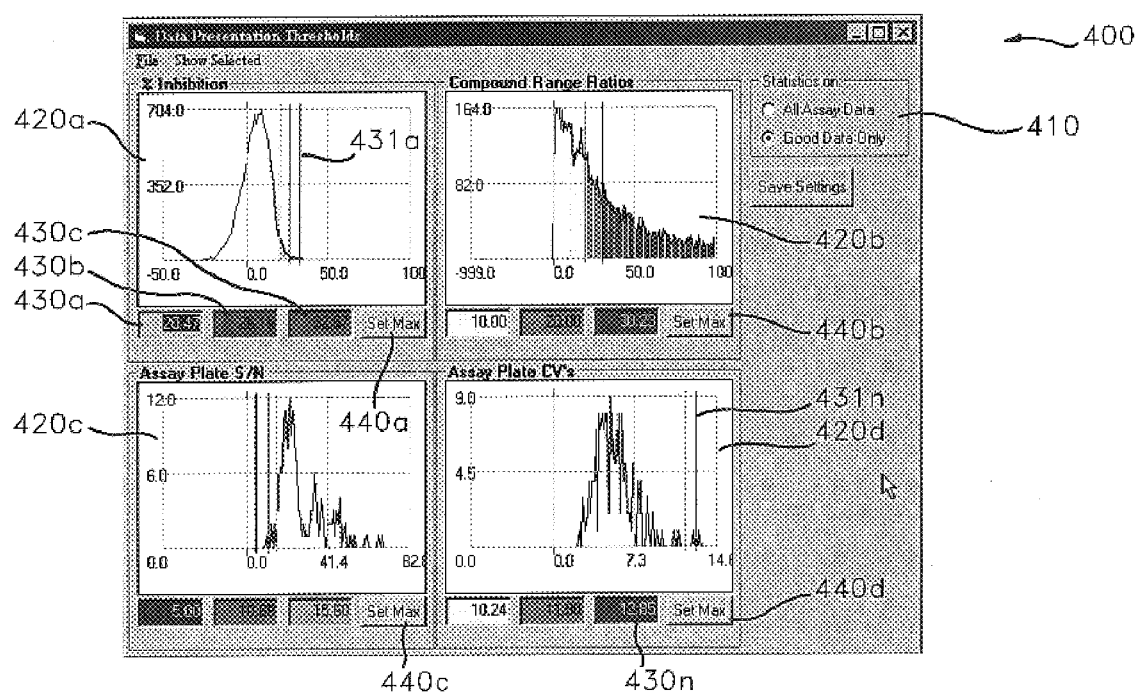
FIG. 4 is a drawing of a display screen subsequent to the display screen of FIG. 3.

Once the desired plates have been selected at the previous two screens (200, 300), the data is thresholded at the screen 400 entitled "Data Presentation Thresholds" shown in FIG. 4. Thresholding is the division of data into a manageable number of categories; it is done to facilitate high speed review and analysis. A binary division (e.g. good/bad) or a quadripartite division (e.g. good/marginally good/ marginally bad/bad) are often desirable, although other divisions are also contemplated.

The data that may be thresholded includes data relative to single wells as well as to entire plates. In the screen 400, thresholds may be set for "% Inhibition," Compound Range Ratios (a measure of how much compound performance varies), Assay Plate Signal to Noise, and Assay Plate CV (a measure of plate variance). A window 420*a–d* for each of the foregoing measures includes a plot of all values (all wells and all plates) of the respective measures for either all assay data or all good assay data, depending upon the selection made in box 410 and filtered as discussed above in connection with screens 200 and 300. Those of skill in the art will recognize that both well and plate performance may be expressed and thresholded in ways different from those presented above. For example, "% Inhibition" could be expressed in a raw form such as a measure of the amount of light observed in a chemiluminescent assay. Rather than a probability distribution of "% Inhibition," a histogram or cumulative probability distribution may also be displayed. Similarly, the Compound Range Ratios may be alternatively expressed in terms of a standard deviation.

FIG. 4 illustrates a quadripartite division. A quadripartite division requires setting three thresholds. These thresholds are set by either typing the desired threshold in the colored threshold dialog boxes 430*a–c* associated with each of the windows 420*a–d* windows (which may be desirable when a desired threshold may be determined in advance independently of the observed data) or by "dragging" the colored threshold lines 431*a–c* corresponding to the dialog boxes 430*a–c* of the same color to the desired threshold location (which may be desirable when thresholds are to be set at natural break points in the observed data). The SET MAX buttons 440*a–d* allow the user to adjust the upper limit of the horizontal axis of each window 420*a–d*.

As each threshold is set at screen 400, the results that pass the threshold are color-coded in the same color as the threshold. It is important to note that the colors associated with each threshold are chosen to be discrete; that is, the colors associated with each threshold are chosen such that they are easily distinguishable, and all data between two thresholds are presented in the same color.

It should be noted that thresholds for "% Stimulation" (which will be displayed on other screens, as discussed below) are also set based upon the "% Inhibition" thresholds. For example, if the three thresholds for "% Inhibition" were set at 10%, 38% and 75% respectively (resulting in ranges of 10%–38%, 38%–75%, and 75%–100%), then the first threshold for "% Stimulation" is chosen as 10% (10%–38%); the second threshold is chosen as 38% (38%–75%); and the last threshold is chosen as 75% (75%–100%). Thus, the "% Stimulation" thresholds are the equivalent to the "% Inhibition" thresholds but in the opposite direction. Other relationships between the "% Inhibition" and "% Stimulation" thresholds are also possible, of course.

Figure 5:
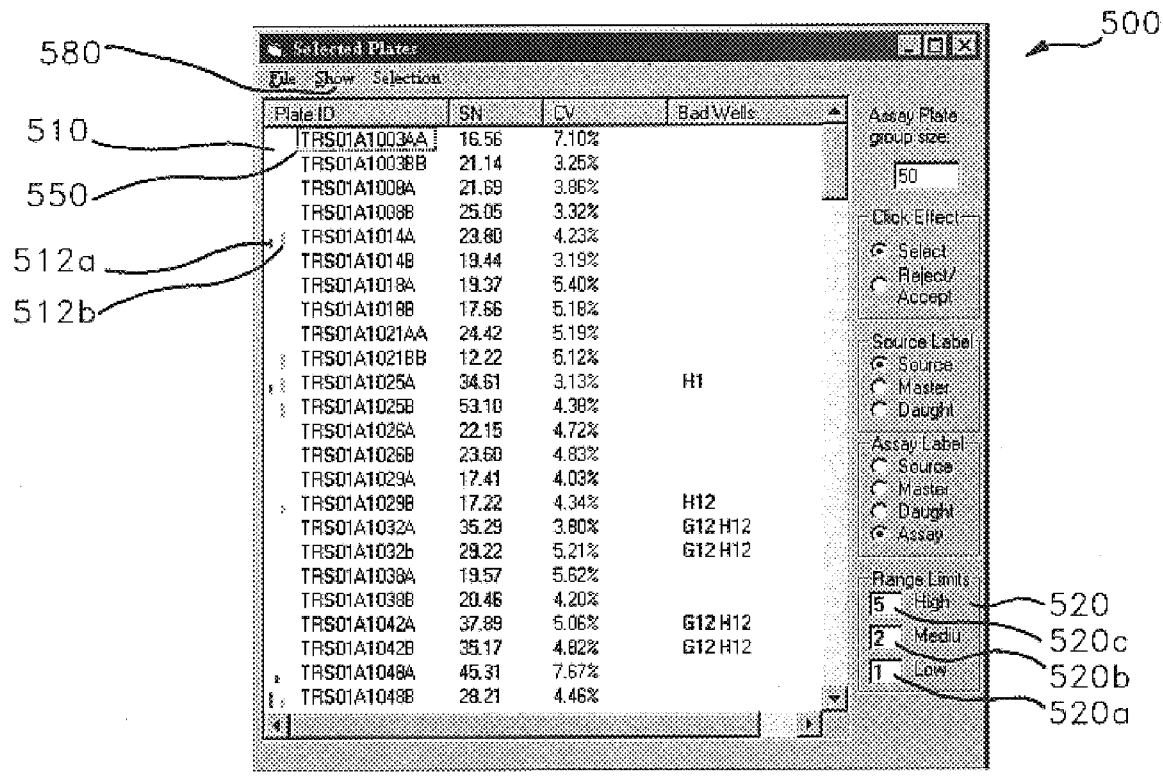
FIG. 5 is a drawing of a display screen subsequent to the display screen of FIG. 4.

Once thresholds for the data have been set as described above, a listing of all plates is again presented in table 510 of the "Selected Plates" screen 500 of FIG. 5. Screen 500 provides the user with an additional opportunity to filter data based on the results of the thresholds chosen in screen 400 as described above. Table 510 lists each plate as well as the corresponding signal to noise and CV. Bad wells for each plate are also listed in the far right hand column of table 510. Table 510 also includes an indication of the number of "hits" for each plate in the far left hand column in the form of bar indicators 512. Hits are wells that have surpassed at least one of the thresholds chosen in screen 400 for the well performance measurement ("% Inhibition in this case). The table 510 includes separate bar indicators for each of the three thresholds. The height of the bar indicators represents the number of hits. There are four possible bar indicator heights: 0 (no bar), Low, Medium and High. The relationship between the number of hits and the height of the bar indicators 512 is defined by the Range Limits Box 520. The Range Limits box 520 includes Low, Medium and High dialog boxes 520*a,b,c*, respectively. In FIG. 5, these values are Low=1, Medium=2 and High=5. Thus, if a plate has no hits (i.e., no wells above the thresholds set in the screen 400), no bars will be present in the far left hand column of table 510. If a plate has a single hit, a bar with a low height will be displayed in the far left hand column of table 510. The color of the bar will depend upon the thresholds set in screen 400. Thus, the bar 512*a* of table 510, which is a low height and red color, signifies that a single well on the plate with ID number TRS01A1014A had a "% Inhibition" above 32.67%. Similarly, the bar 512*b*, which is light blue and medium height, signifies that there were at least 2 and as many as 4 wells with a "% Inhibition" between 20.47% and 26.16% on that same plate. Thus, the bar indicators 512 provide a quick look at the results for each of the plates.

The screen 500 also allows the user to further filter the plates in light of the bar indicator 512 information. Each plate may be selected (by clicking on it once; selected plates are surrounded by a black outline box 550) or de-selected (by clicking on it a second time). Thus, if a user only desired to review results for plates with hits, the screen 500 provides a quick and efficient way for the data to be presented. This should be contrasted with prior art review and analysis programs as discussed above, where plates would need to be reviewed one screen at a time in a numerical (rather than color) format in order to identify plates of interest.

After the user has reviewed the plates at the "Selected Plates" screen 500, the user has the option (via the Show menu 580 of FIG. 5) of viewing the data in one of four formats: "Assay Plate Patterns," "Summary Plates," "Assay Plates," and "Assay Plate Performance." Each format will be discussed in turn below in no specific order. A user will often switch between these formats in the process of filtering and analyzing data.

Figure 7:
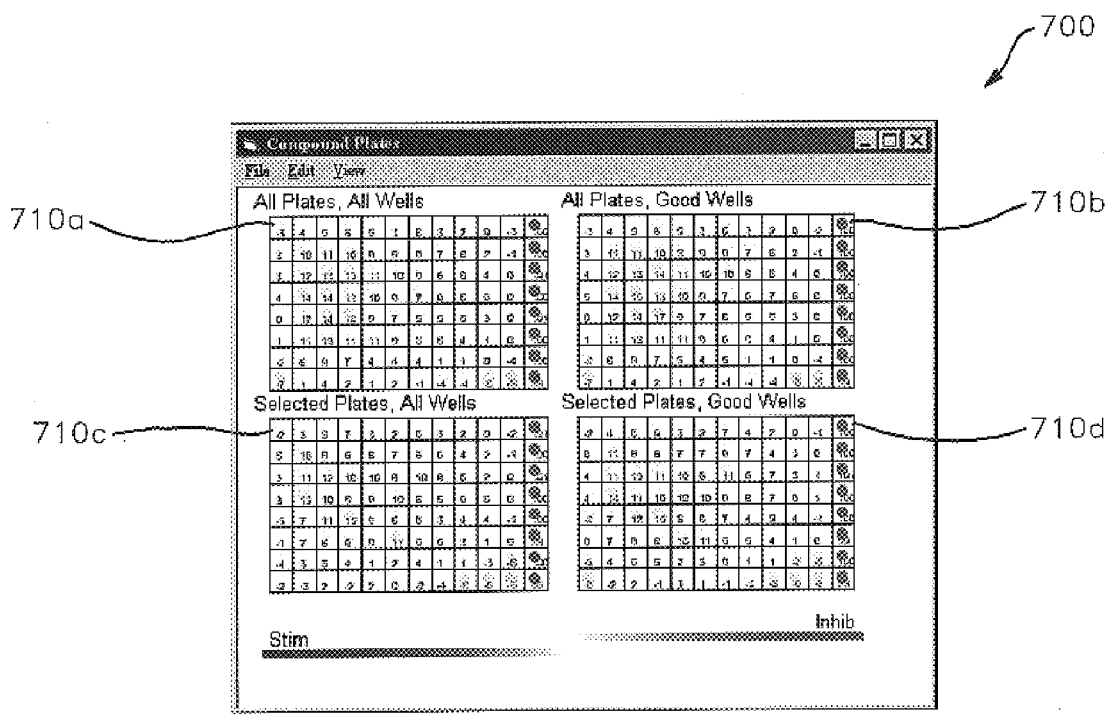
FIG. 7 is a drawing of a display screen subsequent to the display screen of FIG. 6.

FIG. 7 illustrates the "Assay Plate Patterns" screen 700. This screen displays four 8×12 cell tables 710a–d, wherein each table cell represents the average "% Inhibition" (or other well performance measure) for each corresponding well across four possible subsets of data: all plates/all wells; all plates, good wells only (good wells are those wells not marked as bad, which may be done at screen 600 discussed below); selected plates only, all wells; and selected plates only, good wells only. Values other than average, such as mean, maximum, minimum, etc. could also be displayed. The values are displayed in both numerical format and in a color-coded format. In the color coded-format, the intensity of the colored dots in each cell represents the magnitude of the value. Thus, cells in the left-most columns of tables 710a–d, which are used as control cells, exhibit a bright red color representing 100% inhibition, while non-control cells with lesser magnitudes exhibit a pale red color (cells with very low magnitudes appear colorless).

The format of screen 700 allows subtle trends in the data, which might escape notice in a plate-by-plate format, to be quickly spotted. For example, it appears from a brief glance at FIG. 7, that the % Inhibition is highest for cells in the upper left hand quarter of all of the tables 710a–d. This type of correlation in the data may be a "fluke," but it also might be of great importance.

Figure 10:
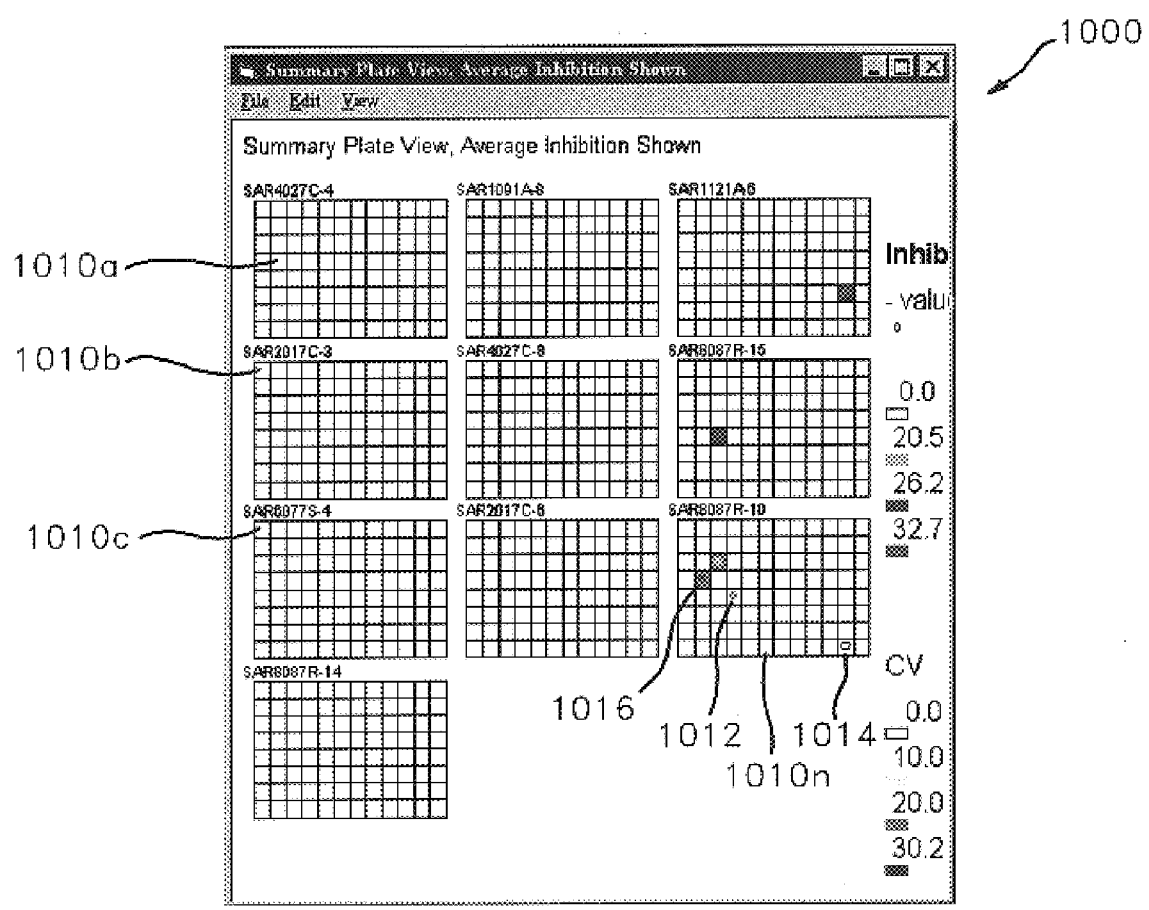
FIG. 10 is a drawing of a display screen subsequent to the display screen of FIG. 9.

It will be recognized by those of ordinary skill in the art that a discrete color-coded format, such as the format depicted in FIG. 10, could also be used in place of the continuous intensity display of FIG. 7.

Figure 8:
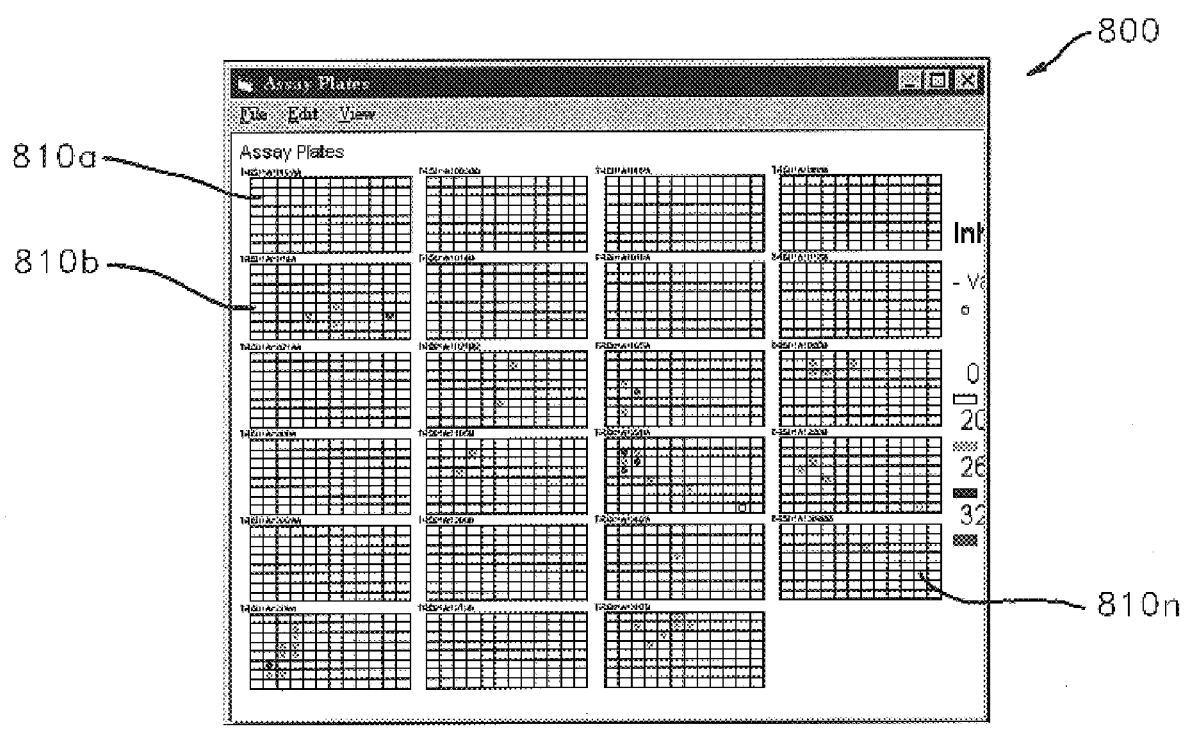
FIG. 8 is a drawing of a display screen subsequent to the display screen of FIG. 7.

FIG. 8 illustrates the "Assay Plates" screen 800. The assay plates screen 800 displays multiple tables 810a–n, with each table 810a–n representing the results of an assay plate. Each cell of the tables 810a–n again represents a corresponding plate well. A colored circle appears in each well in which a hit (relative to the thresholds defined at screen 400) has occurred. The circle will be solid for hits exhibiting inhibition, while the circle will be "hollow" for hits exhibiting stimulation. This screen should again be compared with the prior art screen 100. In screen 800, the results from 23 different plates may be analyzed more quickly than the results from a single plate in screen 100. This increase in efficiency is especially important in high throughput screening.

Screen 800 also provides the user with the ability to select individual wells. Wells are selected so that the compound in that well is added to the compound list, which is discussed below in connection with screen 900. Wells may be selected by left-clicking on the desired wells. Furthermore, keys are provided that allow the user to select all compounds, select any compound that exhibits inhibition or stimulation, select all compounds that exhibit maximum inhibition (i.e. pass the highest threshold) only, select all cells that exhibit medium inhibition only, select all cells that exhibit the lowest inhibition only, etc.

Figure 6:
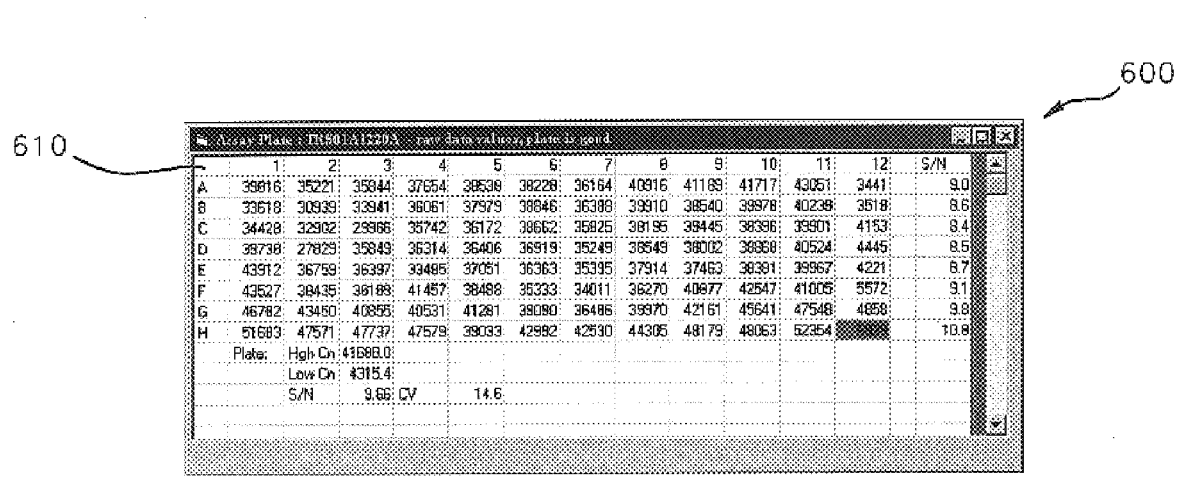

It should be noted that display of the data in a format similar to the prior art view is also available. By clicking on a Plate ID from screen 800, a screen 600, as shown in FIG. 6, is presented to the user. This screen includes a table 610 in a format similar to that of the prior art. This screen also allows individual wells to be marked as bad (by clicking on the corresponding table cell once) or unmarked (by clicking on the corresponding table cell a second time). This screen also allows entire rows (by clicking on the letter in the left-hand side of the table 610 corresponding to the bad row, or even the entire plate to be marked as bad (by clicking on the upper left hand corner of the table). Marking wells as bad allows a user to examine results from good wells only in a summary form such as the "Assay Plate Patterns" screen 700 as discussed above.

Figure 9:
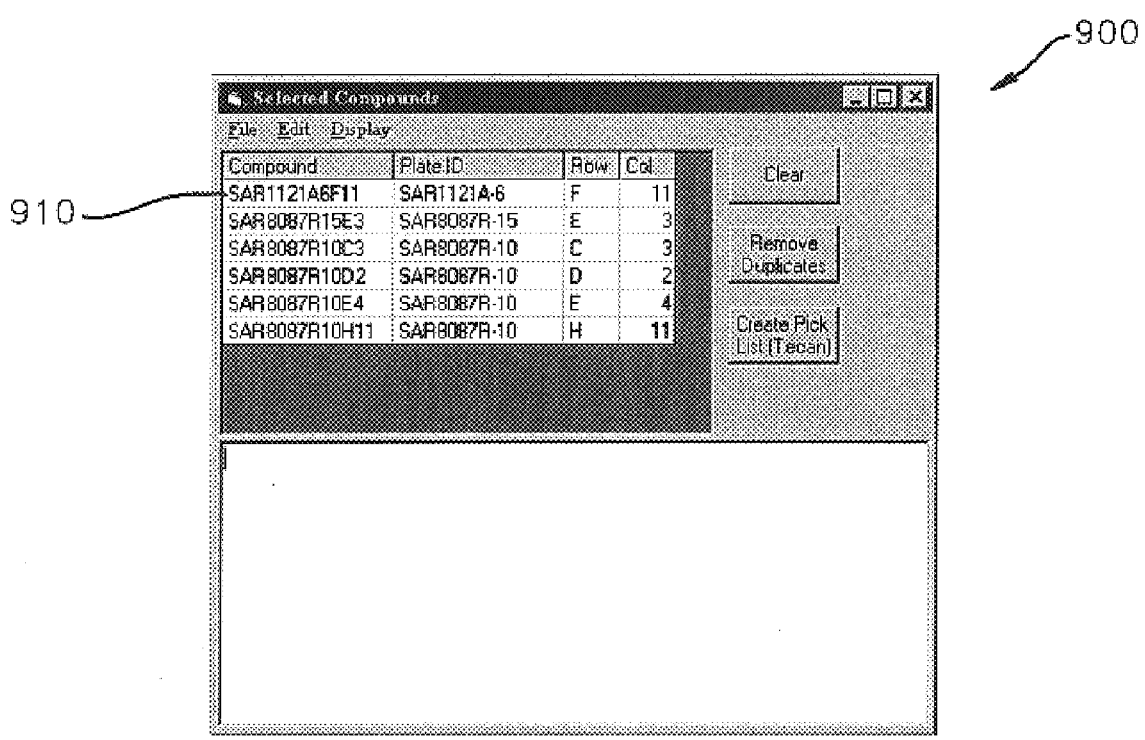
FIG. 9 is a drawing of a display screen subsequent to the display screen of FIG. 8.

FIG. 9 illustrates the Compound List screen 900, which is presented in a 'pop-up' background window each time a compound in the same assay is added to the compound list. The compound list screen 900 includes a table 910 listing each compound well selected from screen 800 and its source plate ID and assay plate location.

FIG. 10 illustrates the summary plate screen 1000. The summary plate screen 1000 is especially useful in situations in which multiple microplates with identical material in corresponding wells are used for multiple tests of the same compound (such as when multiple microplates are prepared for a single source plate which may have different compounds in respective source plate wells). Each cell of plate table 1010a–n in screen 1000 indicates a summary value, such as average inhibition, maximum inhibition, minimum inhibition, etc. As in screen 800, a color-coded solid dot 1012 or hollow dot 1014 is placed in cells with a "% Inhibition" or "% Stimulation" above the thresholds set at screen 400. In addition, a background color 1016 (corresponding to the thresholds set at the threshold screen 400) indicating the compound range ratio is displayed. A continuous intensity color-coded format, such as the format shown in FIG. 7, could be used in place of the discrete format shown in FIG. 10.

Figure 11:
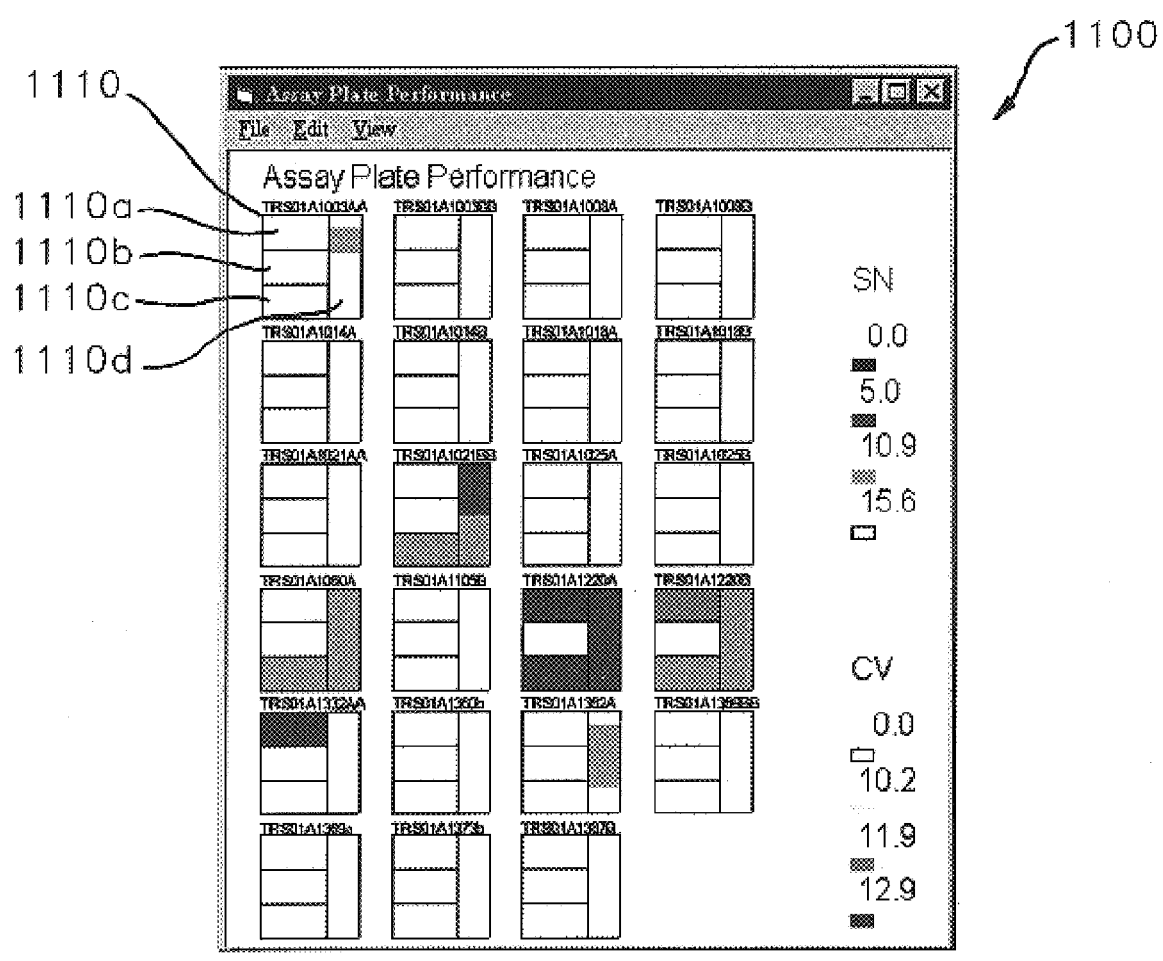
FIG. 11 is a drawing of a display screen subsequent to the display screen of FIG. 10.
Figure 12:
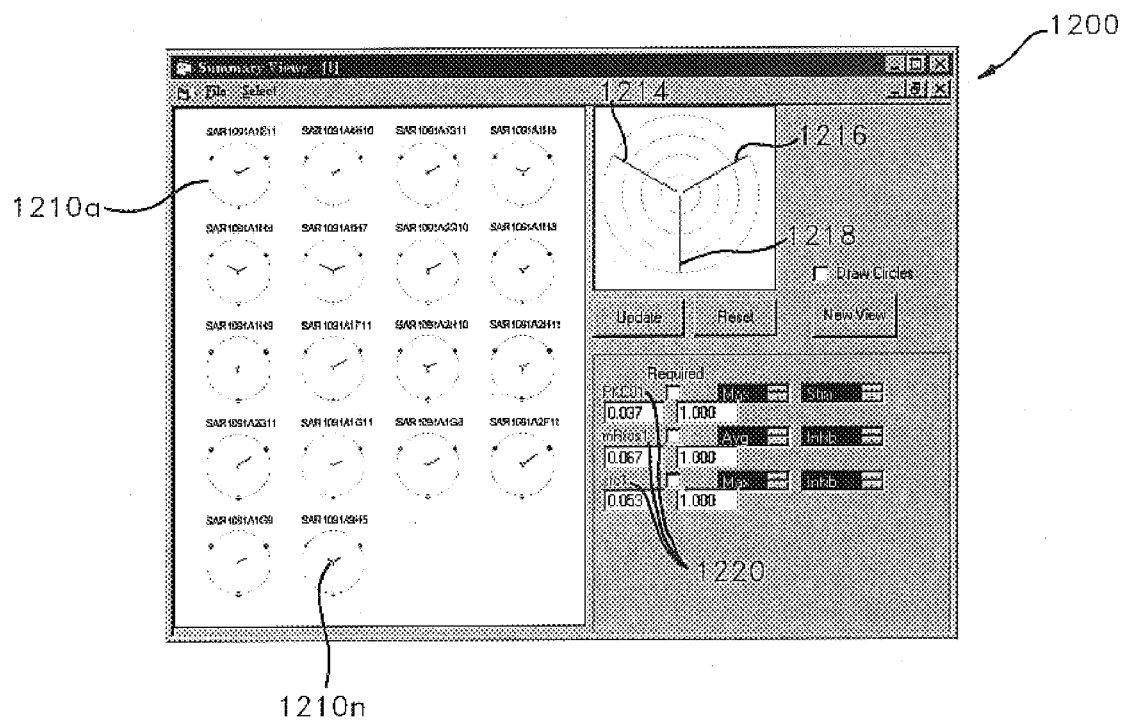
FIG. 12 is a drawing of a display screen subsequent to the display screen of FIG. 11.

FIG. 11 illustrates the assay plate performance screen 1100. The purpose of the assay plate performance screen 1100 is to display plate-wide statistics so that poorly performing plates can be quickly identified. The screen 1100 includes a plate summary box 1110 including four sub-boxes: a plate CV box 1110a, an unused box 1110b, a plate signal-to-noise box 1110c and a row signal-to-noise box 1110d. Each box is color coded, again corresponding to the thresholds set at screen 400. The plate CV and SIN boxes 1110a, 1110c are entirely filled with the appropriate color. The row S/N box 1110d is filled in at locations corresponding to the positional locations of rows on the assay plate. Thus, for example, if the upper four rows (out of eight) on a plate had a poor S/N, then the upper half of the row S/N box 1110d would be filled in with the appropriate color. By clicking on a summary plate box 1110, the text-based screen 600 is displayed to the user. As discussed above, this screen allows entire rows or even plates to be marked as "bad." Thus, the screen 1100 allows a user to quickly eliminate assay results from plates with poor signal-to-noise ratios by marking the appropriate wells as bad.

The foregoing screens all allow the results of only one assay type to be reviewed at a time. Screen 1200 displays the results of multiple types of assays for multiple compounds (the desired assay types are chosen in a prior screen not shown here). Each compound is represented as a polar plot 1210a–n. Each polar plot 1210a–n includes a number of vectors 1214, 1216, 1218, each with a different magnitude and angle. The results for different assays are at different angles and are color-coded to match the assay names 1220 displayed near the lower right hand corner of screen 1200. The length of each vector represents the result, such as "% Inhibition," for each assay, with the longest possible vector representing 100% inhibition. As above, the results may be expressed as average, maximum, minimum, or mean (or any other relationship) "% Inhibition." Furthermore, rather than "%Inhibition," "% Stimulation" may also be displayed. Other variations on this display are also possible.

A program adapted for the display and analysis of high throughput screening data has been described. The display program presents data in a format that facilitates rapid analysis. This is accomplished through providing the user with the ability to create thresholds by which assay results may be color-coded and by displaying assay results in a single assay, multiple plate format as well as a multiple compound, multiple assay format. Data analysis is also aided through the presentation of summary screens which show results of multiple assay iterations as well as the presentation of plate-wide statistics across multiple plates.

While the invention has been described in detail in connection with the preferred embodiments known at the time, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Accordingly, the invention is not to be seen as limited by the foregoing description, but is only limited by the scope of the appended claims.

What is claimed is:

1. A method for displaying assay results, the method comprising the steps of:

presenting assay results for a single assay from multiple assay plates and wells in a graphical form;

providing a user with the ability to set at least one assay threshold;

presenting well results for each well on multiple plates on a single display screen, the assay results being in a discrete color-coded format based upon at least one assay threshold.

2. The method of claim 1, wherein the assay results and well results are expressed as a percentage of inhibition.

3. The method of claim 2, wherein the graphical form is a plot of the probability distribution of the percentage of inhibition.

4. The method of claim 2, wherein the graphical form is a histogram of the percentage of inhibition.

5. The method of claim 1, wherein the threshold is set by entering a numerical value.

6. The method of claim 1, wherein the threshold is set by dragging a threshold bar to a desired location on the graphical form.

7. The method of claim 1, wherein the well results are presented in multiple tables, each of the tables corresponding to an assay plate, each of the tables having multiple cells, each cell corresponding to a well on a respective assay plate.

8. The method of claim 7, wherein each of the cells is partially filled with a color corresponding to the at least one threshold.

9. The method of claim 8, wherein the cells are partially filled with colored circles corresponding to the at least one threshold.

10. The method of claim 1, wherein the assay results are generated using high throughput screening.

11. A method for displaying assay results, the method comprising the step of displaying assay results for a plurality of assay plates in a single table, the table having a plurality of cells, each of the cells being in a spatial relationship with respect to each other corresponding to a spatial relationship of a respective well on the assay plates with respect to other wells on the assay plate, each of the cells having a cell value based on combined assay plate results from respective wells from at least a first portion of the plurality of assay plates.

12. The method of claim 11, wherein the cell value is based on combined assay plate results from respective wells from all of the plurality of assay plates.

13. The method of claim 11, wherein the cell value is based on combined assay plate results from respective wells from assay plates selected by a user.

14. The method of claim 11, wherein the compounds in corresponding wells of each assay plate in the first portion are the same.

15. The method of claim 11, further comprising the steps of repeating the displaying step for a second portion, the compounds in each well of each assay plate of the second portion being the same as compounds in corresponding wells of plates in the second portion and being different from compounds in other wells of plates in the first portion.

16. The method of claim 11, wherein the cell value is expressed in a color-coded format wherein a color intensity indicates the magnitude of the cell value.

17. The method of claim 11, further comprising the step of providing a user with the ability to set at least one threshold, wherein the cell value is expressed in a discrete color-coded format based on the threshold.

18. The method of claim 11, wherein the cell value is an average of results from respective wells.

19. The method of claim 11, wherein the cell value is a minimum of results from respective wells.

20. The method of claim 11, wherein the cell value is a maximum of results from respective wells.

21. The method of claim 11, wherein the assay results are generated using high throughput screening.

22. A method for displaying assay results comprising the steps of:

providing a user with the ability to set at least one assay threshold for a value relevant to an entire assay plate;

displaying values from multiple assay plates on a single screen, the values corresponding to the value for which the assay threshold is set, the value being presented in a discrete color-coded format based on the assay threshold.

23. The method of claim 22, wherein the value represents the signal to noise ratio for a respective assay plate.

24. The method of claim 22, wherein the value represents the variability for a respective assay plate.

25. The method of claim 22, wherein the color-coded format comprises a box.

26. The method of claim 22, wherein a plurality of values relevant to an assay plate are displayed for each plate.

27. The method of claim 26, wherein the plurality of values include values representing signal to noise and variability.

28. The method of claim 22, wherein the assay results are generated using high throughput screening.

* * * * *